Nov. 18, 1930.  H. SCOTT-PAINE  1,782,320
HULL OF WATER CRAFT

Filed Oct. 15, 1929

INVENTOR

Hubert Scott-Paine

Patented Nov. 18, 1930

1,782,320

UNITED STATES PATENT OFFICE

HUBERT SCOTT-PAINE, OF SOUTHAMPTON, ENGLAND

HULL OF WATER CRAFT

Application filed October 15, 1929, Serial No. 399,813, and in Great Britain November 30, 1928.

This invention is for improvements in the hulls of motor boats, hydroplanes and like craft, all hereinafter referred to as watercraft, of the type in which the hull has a stepped bottom. Heretofore such steps have been incorporated in the construction of the hull.

According to the present invention there is provided a stepped structure which is separately constructed and is removably secured to the hull. It is an important advantage of this arrangement that the step can be readily replaced if damaged. Furthermore, any damage which is confined to the step does not interfere with the seaworthiness of the craft so that its safety is very greatly enhanced.

In some cases the hull may be constructed with a permanent step in it, but this step is situated forward of the desired position for the step, and an additional partial step structure as above described is secured to the hull adjoining the permanent step structure thus forming a removable section of the complete step. With this arrangement the changeability of the after end of a step on a hull to improve the performance of the craft, is easily effected, and it enables any alteration of step design to be quickly and cheaply carried out.

Conveniently the step structure is formed as a separate self-contained unit, and means is provided whereby said unit can be detachably secured to the hull.

For a more complete understanding of the invention one embodiment thereof will now be described, by way of example, with reference to the accompanying drawings in which:—

Figure 1:
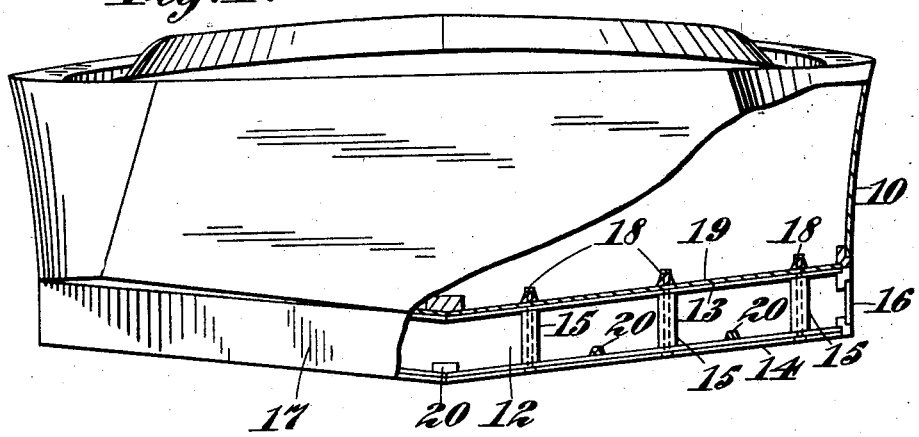
Figure 2:
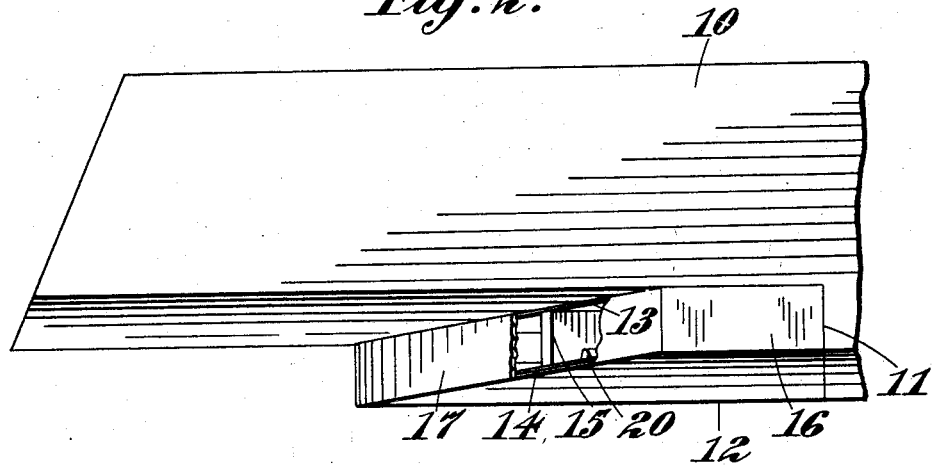
Figure 3:
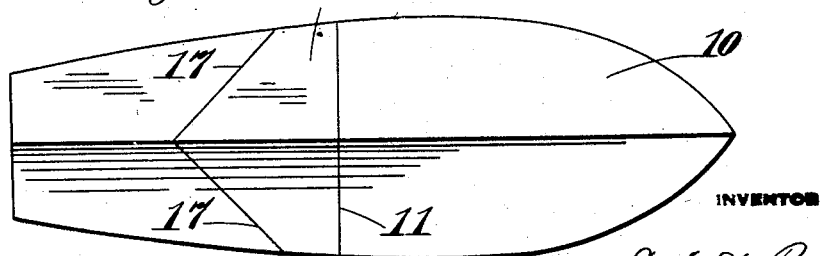

Figure 1 is an end elevation looking forward and partly in section of a motor boat with the invention applied thereto, Figure 2 is a side elevation partly in section, and Figure 3 is an underside plan drawn to a reduced scale.

In the embodiment shown in the drawings, the bottom of the hull 10 is constructed with a permanent step 11 incorporated therein. This permanent step is situated forward of the desired position for the after end of the step, and an additional partial step structure indicated as a whole by the reference numeral 12, is removably secured to the bottom of the hull adjoining the permanent step 11. This additional step structure is a self-contained unit and comprises upper and lower walls 13, 14 which are spaced apart by a number of beams 15, together with side and end walls 16, 17 respectively. In the drawings the beams 15 are arranged longitudinally of the boat but they may be arranged transversely thereof if desired. The unitary structure thus formed is detachably secured to the bottom of the hull by means of bolts 18 passing through holes provided therefor in the longitudinal beams 15. The upper wall 13 of the removable step structure may be formed by a single layer of planks as this wall abuts against the bottom 19 of the hull, but the lower wall 14 of said step structure is preferably formed by two layers of planks secured to bearers 20, as shown in Figures 1 and 2 in order to give the necessary strength. If desired, the upper wall 13 of the step structure may be omitted. The after end walls 17 of the removable step are inclined respectively from the sides of the hull towards the centre as clearly shown in Figure 3. These end walls may be at any desired inclination, or even at right angles, to the fore and aft centre line of the boat. Moreover, they are not essential and may be omitted leaving an open-ended structure.

It will be appreciated that by means of this invention the construction of the hull is simplified and very greatly strengthened, and its cost reduced. Moreover, step structures, for instance having differently inclined end walls 17, can be interchangeably secured to the hull at will. Although in the specific embodiment of the invention illustrated in the drawings a partial step structure is shown adjoining a permanent step, it is to be understood that if desired the whole of the step may be removably secured to the hull in the manner described above and such a construction is included within the scope of the invention.

I claim:—

1. A step structure for watercraft of the type wherein the hull has a stepped bottom, comprising a lower wall spaced from the hull by a number of beams, side walls arranged to form with the lower wall and said beams a unitary structure, and a number of bolts passing through holes in said beams for detachably securing said unitary structure to the bottom of the hull.

2. In watercraft of the type which has a stepped hull-bottom, a step-structure separately constructed as a box-like unit and shaped on the side coming into contact with the hull-bottom to the configuration of said hull-bottom and means whereby said unit can be detachably secured to said hull-bottom.

3. Watercraft comprising in combination a hull having a step-structure forming a permanent part of the hull-bottom, a step-structure separately constructed as a box-like unit and shaped on the side coming into contact with the hull-bottom to the configuration thereof and means whereby said unit can be detachably secured to said hull-bottom.

4. Watercraft comprising in combination a hull having a step-structure forming a permanent part of the hull-bottom, a step-structure separately constructed as a box-like unit and adapted to form an extension of the permanent step and shaped on the side coming into contact with the hull-bottom to the configuration thereof and means whereby said unit can be detachably secured to said hull-bottom.

5. A step-structure for watercraft wherein the hull has a stepped-bottom comprising in combination a lower wall spaced from the hull by a number of beams, side walls arranged to form with the lower wall and said beam a unitary structure, an end wall closing the outer end of the structure and bolts passing through holes in said beams for detachably securing said unitary structure to the bottom of the hull.

In testimony whereof I affix my signature.
HUBERT SCOTT-PAINE.